US012794263B2

United States Patent
Palmer et al.

(10) Patent No.: US 12,794,263 B2
(45) Date of Patent: Nov. 10, 2026

(54) SYSTEMS AND METHODS FOR PERFORMING ELECTRICAL GRID PRIMARY FREQUENCY RESPONSE VIA A FLEXIBLE DATA CENTER

(71) Applicant: US Data Mining Group, Inc., Miami, FL (US)

(72) Inventors: Jake Palmer, Coto De Caza, CA (US); Riley Trettel, Lino Lakes, MN (US)

(73) Assignee: US Data Mining Group, Inc., Miami, FL (US)

( * ) Notice: Subject to any disclaimer, the term of this patent is extended or adjusted under 35 U.S.C. 154(b) by 332 days.

(21) Appl. No.: 18/530,957

(22) Filed: Dec. 6, 2023

(65) Prior Publication Data

US 2024/0186823 A1 Jun. 6, 2024

Related U.S. Application Data

(60) Provisional application No. 63/430,450, filed on Dec. 6, 2022.

(51) Int. Cl.
*H02J 13/12* (2026.01)
*H02J 3/14* (2026.01)
*H02J 3/32* (2026.01)

(52) U.S. Cl.
CPC ................ *H02J 13/12* (2026.01); *H02J 3/14* (2013.01)

(58) Field of Classification Search
CPC ................. H02J 13/12; H02J 3/14; H02J 3/32
USPC ........................................................ 700/295
See application file for complete search history.

(56) References Cited

U.S. PATENT DOCUMENTS

2015/0240784 A1* 8/2015 Sagi ........................ F03D 7/048 700/287
2017/0179722 A1* 6/2017 Porter ....................... H02J 3/32
2021/0276442 A1* 9/2021 Schroeder ............... B60L 53/60
2021/0312574 A1 10/2021 McNamara et al.
2022/0121260 A1 4/2022 King et al.
2022/0200574 A1 6/2022 Nielsen et al.

OTHER PUBLICATIONS

International Search Report and Written Opinion issued in International Application No. PCT/US2023/082687, date of mailing: Mar. 22, 2024, 13 pages.

* cited by examiner

*Primary Examiner* — Michael J Brown
(74) *Attorney, Agent, or Firm* — Brown Rudnick LLP; Matthew P. York

(57) ABSTRACT

The present invention is directed to a uniquely designed front-of-the-meter (FTM), grid-facing flexible data center system. The FTM flexible data center is configured to communicate with and receive data from an ISO and assist in managing subsequent transmission of electrical energy to energy consumers in response to received data from the ISO. More specifically, in response to signals, commands, and/or input from the ISO, the FTM flexible data center is able to dynamically modulate power consumption characteristics to thereby correct any real-time electrical grid frequency fluctuations and allow the electrical grid to maintain a stable alternating current (AC) frequency.

16 Claims, 2 Drawing Sheets

SYSTEMS AND METHODS FOR PERFORMING ELECTRICAL GRID PRIMARY FREQUENCY RESPONSE VIA A FLEXIBLE DATA CENTER

CROSS-REFERENCE TO RELATED APPLICATIONS

This application claims priority to, and the benefit of, U.S. Provisional Application No. 63/430,450, filed Dec. 6, 2022, the content of which is incorporated by reference herein in its entirety.

TECHNICAL FIELD

The present invention relates to the field of electrical energy storage and distribution, and, more particularly, to a uniquely designed front-of-the-meter (FTM), grid-facing flexible data center system.

BACKGROUND

Electric power is an essential component of everyday life. In the modern world, not a day goes by without many of us using electricity to power up devices, equipment, electronics and many other things. Electric power for a site (e.g., a home, school, commercial building, etc.) can be generated on site in some cases but is mainly generated elsewhere and transported to the site via an electrical distribution system tied into an electrical grid.

An "electrical grid" or "grid", as used herein, is a complex interconnected network for generating, transmitting, and ultimately distributing electricity from producers to consumers. An electrical grid typically includes: (i) generation stations that produce electrical power at large scales for delivery through the grid, (ii) high voltage transmission lines that carry that power from the generation stations to demand centers, and (iii) distribution networks carry that power to individual customers.

Any given electrical grid includes different entities for managing the various aspects of energy generation, transmission, and distribution across the network. For example, a grid operator (also referred to as a "balancing authority" or an "independent system operator (ISO)") is a regional entity that controls electrical energy as it travels through a fixed infrastructure. More specifically, an ISO is an independent organization that handles electric grid operations, market facilitation for certain electric markets, and bulk electric system planning. If competitive generation markets are to work effectively, electricity generators (i.e., entities responsible for generating/producing electricity to be delivered via the grid) must have nondiscriminatory access to the transmission system to deliver their power to customers. As such, ISOs were created to facilitate competitive wholesale electric markets. In particular, a given ISO does not own electrical transmission, but rather manages transmission owned by other entities (either utilities or transmission companies). The ISO handles all the system operations functions of scheduling generation, transmission, and reserves, including managing the system in real time and further tasked with system planning. Furthermore, in some cases, ISOs also facilitate day-ahead energy and forward capacity markets. For example, an ISO monitors the power grid, signaling to power plants (or other electricity generators) when more power is needed and maintaining the power grid's electrical flow to the transmission lines and distribution network.

Electrical grids typically operate at a synchronized frequency and are electrically tied together during normal system conditions. In particular, in a given grid, all distribution areas typically operate with three phase alternating current (AC) frequencies synchronized with one another such that voltage swings occur at almost the same time. This allows transmission of AC power throughout the area, connecting a large number of electricity generators and consumers and potentially enabling more efficient electricity markets and redundant generation.

There are monetary incentives put forth by a given ISO and the end consumers who want the electrical grid AC frequency to remain constant at 60 Hz. When the electrical grid frequency departs significantly from 60 Hz, electrical grid protection equipment such as circuit breakers and switches will trip to protect transmission lines, transformers, AC generators, and turbine engines from damage, thereby resulting in blackout conditions. However, such blackouts come at a large cost to energy consumers, some of which are critical to life or protection of property. When energy consumers increase their consumption, the frequency of the electrical grid drops due to increased rotational energy required from turbine engines to meet the demand for electricity. ISO's have traditionally employed very strict day-ahead generation and grid capacity scheduling to control for this problem, while commanding spinning generators to increase or decrease their fuel consumption in real-time to adjust for minute frequency fluctuations. However, this method is unreliable on very short time scales and subjects the generators to unnecessary wear and tear due to constant throttle and brake fluctuations. Accordingly, current practices for managing electrical grid AC frequency have significant drawbacks.

SUMMARY

The present invention is directed to a uniquely designed front-of-the-meter (FTM), grid-facing flexible data center system configured to address the drawbacks of current systems and methods for managing electrical grid frequency. In particular, the FTM flexible data center is configured to communicate with and receive data from an ISO and assist in managing subsequent transmission of electrical energy to energy consumers in response to received data from the ISO. More specifically, in response to signals, commands, and/or input from the ISO, the FTM flexible data center is able to dynamically modulate power consumption characteristics to thereby correct any real-time electrical grid frequency fluctuations and allow the electrical grid to maintain a stable alternating current (AC) frequency.

In one embodiment of the present disclosure, the FTM flexible data center is configured to receive, in real-time or near real-time, a plurality of signals from the ISO associated with an AC frequency of the electrical grid and dynamically adjust power consumption characteristics if a signal indicates that the AC frequency of the electrical grid crosses a predetermined threshold as set by the ISO. More specifically, the FTM flexible data center is configured to transition between a steady-state power consumption mode and a curtailed-state power consumption mode in response to the AC frequency of the electrical grid crossing the predetermined threshold. In the event that a given signal indicates that the AC frequency of the electrical grid drops below a predetermined threshold, the FTM flexible data center is configured to transition to the curtailed-state power consumption mode and thereby perform dynamic load shedding in real-time.

For example, the FTM flexible data center includes, among other things, a power control logic system configured to receive data, including a plurality of signals, commands, and/or input, from the ISO. The ISO is able to transmit, in real-time or near real-time, a plurality of signals associated with an AC frequency of the electrical grid. In turn, the power control logic system is able to effectively distribute any commands associated with such data received from the ISO to a distributed capacitor system operably coupled to the power control logic system. The distributed capacitor system is configured to engage in dynamic load shedding based on commands received from the power control logic system in response to the data, plurality of signals, commands, and/or input from the ISO, thereby transitioning the FTM flexible data center from the steady-state power consumption mode to the curtailed-state power consumption mode.

The distributed capacitor system includes a plurality of capacitors and power transforming equipment capable of storing AC power, converting said AC power to direct current (DC) power, and transmitting said DC power to a distributed computing system. In some embodiments, the distributed capacitor system includes a plurality of computing systems configured to respectively control each of the plurality of capacitors and evenly distribute DC power to the distributed computing system without causing damage to the distributed computing system when the FTM flexible data transitions to the curtailed-state power consumption mode. Upon receiving a command from the ISO to commence power consumption following a shut down, the distributed capacitor system is configured to cause all of the plurality of capacitors to commence charging concurrently, and a load of the flexible data center returns to steady-state power consumption level in less than five seconds.

The FTM flexible data center is operably coupled to a grid-facing substation connected to the electrical grid, the grid-facing substation being configured to provide transmission level AC current to be subsequently transmitted to energy consumers. The grid-facing substation comprises at least circuit breakers, switches, and high to medium voltage transformers for delivering transmission level AC current to medium voltage AC power. The FTM flexible data center further includes a medium voltage electrical distribution system comprising at least medium voltage transmission lines, circuit breakers, and switches for receiving medium voltage AC power from the grid-facing substation and medium to low voltage transformers configured to receive the medium voltage AC power from the medium voltage electrical distribution system and step down the medium voltage AC power for delivery to at least the distributed capacitor system.

Accordingly, the FTM flexible data center of the present invention is able to address and overcome the drawbacks of current practices for managing electrical grid AC frequency in light of fluctuations in energy demand. More specifically, the power control logic system and distributed capacitor system allow for the FTM flexible data center to perform dynamic load shedding reliably and rapidly without damaging the distributed computing system. Thus, in response to increased consumption of electricity from energy consumers, and thus increase in overall demand, the FTM flexible data center is designed to shift this obligation off of the generator and onto itself as the distributed capacitor system acts as a large shock absorber for the distributed computing system that protects it from rapid fluctuations in power consumption that is detrimental to silicon chip reliability.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to a front-of-the-meter (FTM), grid-facing flexible data center system. The FTM flexible data center is configured to communicate with and receive data from an ISO and assist in managing subsequent transmission of electrical energy to energy consumers in response to received data from the ISO. More specifically, in response to signals, commands, and/or input from the ISO, the FTM flexible data center is able to dynamically modulate power consumption characteristics to thereby correct any real-time electrical grid frequency fluctuations and allow the electrical grid to maintain a stable alternating current (AC) frequency.

Figure 1:
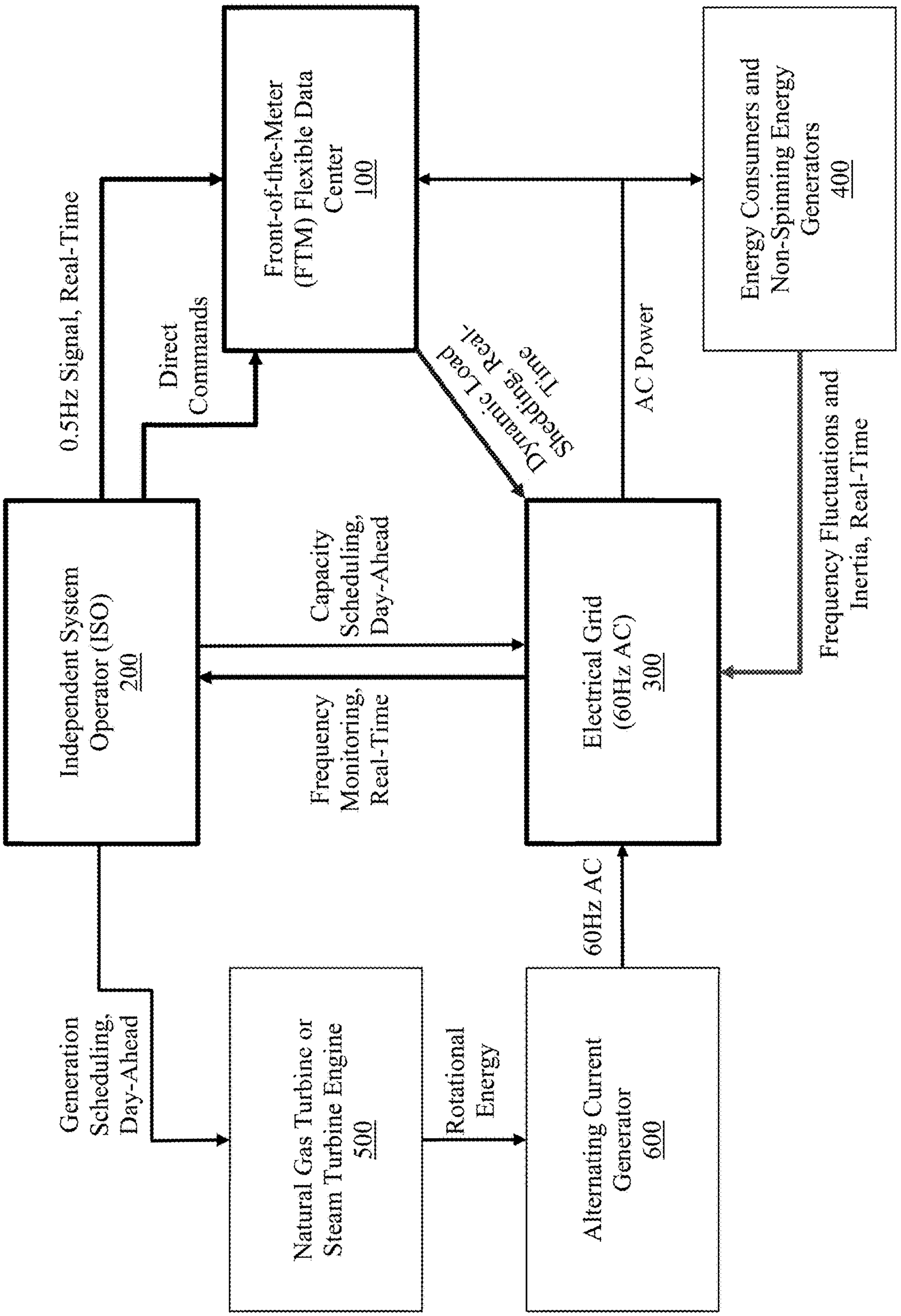
FIG. 1 is a block diagram illustrating an exemplary electrical grid network including an FTM flexible data center consistent with the present disclosure.

Turning now to the figures, FIG. 1 is a block diagram illustrating an exemplary electrical grid network including an FTM flexible data center consistent with the present disclosure. As illustrated, the electrical grid network may include an FTM flexible data center 100 operably coupled to an ISO 200 and an electrical grid 300. As described in greater detail herein, the FTM flexible data center 100 is configured to communicate with and receive data from the ISO 200 and assist in managing subsequent transmission of electrical energy to energy consumers 400 in response to received data from the ISO 200 by dynamically modulating power consumption characteristics to thereby correct any real-time electrical grid frequency fluctuations and allow the electrical grid 300 to maintain a stable alternating current (AC) frequency.

The electrical grid 300 may consist of generation step-up transformers (GSU), medium and high voltage transmission lines, switching substations, load-serving step-down transformers, circuit breakers, switches, and load-serving substations. The grid 300 may operate on 60 Hz alternating current (AC), which is required to transform voltages and send electrical energy over long distances on medium and high voltage transmission lines that make up the electrical grid 300. The electrical grid delivers AC power (from AC generators 600) to energy consumers 400 and the FTM flexible data center 100 for consumption. The present invention recognizes that the 60 Hz AC frequency must be tightly controlled or else electrical grid circuit breakers and switches will trip, causing blackouts and interrupted service to the energy consumers 400.

Energy consumers 400 include a vast assortment of customers, including, but not limited to, retail, homes, hospitals, businesses, transit, waste disposal, manufacturing, mining, water treatment, and heavy industrial uses. Energy consumption by some consumers is essential for life or for the protection of property. Accordingly, reliable electrical grid service is essential for many different types of consumers and for society to function as a whole. Energy consumers 400 may also include non-spinning generators such as wind turbines and photovoltaic cells which produce energy but do not contribute to the AC frequency of the electrical grid 300. As generally understood, increased consumption of electricity from energy consumers reduces the AC frequency of the electrical grid, while decreased consumption of electricity from energy consumers increases the AC frequency of the electrical grid. It should be noted that non-spinning generators increase the overall net generation of electricity in the electrical grid, but also increase the inertia, or the amount of input required to alter the AC frequency of the electrical grid. Accordingly, the level of consumption of electricity by energy consumer results in electrical grid frequency fluctuations.

The electrical grid network may further include a natural gas turbine or steam turbine engine 500 and an alternating current (AC) generator 600 operably coupled to one another. The turbine engine 500 may be powered by burning natural gas or heating water with different types of fuel and reactions to produce steam, which, in turn, creates rotational energy used to generate electricity (by way of the AC generator 600) and further determine the electrical grid frequency. More specifically, the AC generator 600 may include an input shaft from the turbine engine 500 that turns a magnet inside a stationary copper coil (referred to as a stator). The speed of the magnet's rotation determines the AC frequency. The AC generator 600 may include three individual copper coils within the stator, each of which produces a phase of AC. Accordingly, each phase may be rotated 120 degrees with respect to each other in order to produce a smooth power delivery to energy consumers (via the electrical grid 300). Each AC phase is independent of one another in that the electrical grid lines that carry each phase are separated from each other in space, but the phases meet in the stator of an AC generator 600. As generally understood, phase imbalance and any AC frequency differences between phases in the electrical grid can cause severe damage to the stator and AC generator 600 as a whole. Furthermore, the turbine engine 500 can be severely damaged or destroyed by errant frequency inputs from the electrical grid which can rapidly slow down the turbine or reduce the resistance against it leading to failure or runaway conditions.

The ISO 200 is operably coupled to the electrical grid 300 and configured to monitor electrical grid frequency in real-time or near real-time. More specifically, the ISO 200 monitors the AC frequency of the electrical grid 300 on millisecond time scales to judge the overall health of the electrical grid and further determine the location of faults and/or problems occurring on the electrical grid. The ISO 200 is further configured to continually communicate with and transmit a signal (i.e., every 1 second, every 2 seconds, every 3 seconds, etc.) to the FTM flexible data center 100, the signal being associated with an AC frequency of the electrical grid 300. In turn, the FTM flexible data center 100 is configured to receive, in real-time or near real-time, the signals from the ISO 200 and dynamically adjust power consumption characteristics if a signal indicates that the AC frequency of the electrical grid 300 crosses a predetermined threshold (as set by the ISO 200).

In particular, the FTM flexible data center 100 is configured to transition between a steady-state power consumption mode and a curtailed-state power consumption mode in response to the AC frequency of the electrical grid crossing the predetermined threshold. For example, if a given signal indicates that the AC frequency of the electrical grid drops below a predetermined threshold, the FTM flexible data center is configured to transition to the curtailed-state power consumption mode and thereby perform dynamic load shedding in real-time. The FTM flexible data center is configured to transition from the steady-state power consumption mode to the curtailed-state power consumption mode and stabilize in less than five seconds and energy consumption within the curtailed-state power consumption mode is less than 5% of energy consumption within the steady-state power consumption mode.

In addition to monitoring the electrical grid and communicating AC frequency signals to the FTM flexible data center in real-time (resulting in commanding of the FTM flexible data center to dynamically adjust power consumption characteristics when appropriate), the ISO 200 is also capable of directing day-ahead generation scheduling and day-ahead electrical grid capacity scheduling. The day-ahead generation scheduling involves the ISO scheduling, the day before energy is due to be delivered to energy consumers, the dispatch of energy generators for each time interval and location on the electrical grid. The day-ahead electrical grid capacity scheduling involves the ISO scheduling, the day before energy is due to be delivered to energy consumers, the dispatch of energy generators based on physical capacity constraints of equipment such as transmission lines, circuit breakers, and switches that make up the electrical grid.

Figure 2:
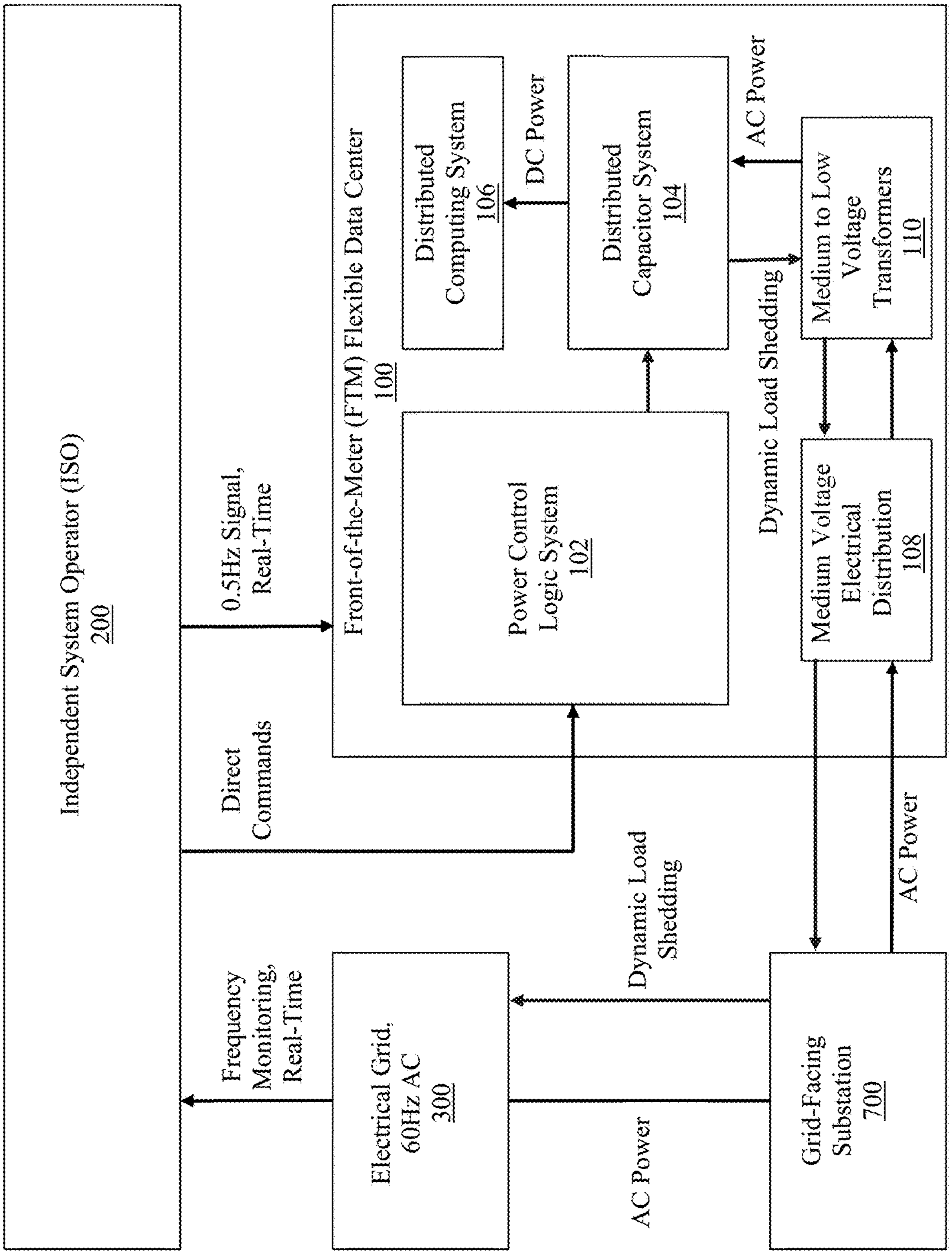
FIG. 2 is a block diagram illustrating the FTM flexible data center in greater detail.

Turning to FIG. 2, various components of the FTM flexible data center are illustrated in greater detail. The FTM flexible data 100 center includes, among other things, a power control logic system 102 configured to receive data, including a plurality of signals, commands, and/or input, from the ISO 200. The ISO 200 is able to transmit, in real-time or near real-time, a plurality of signals associated with an AC frequency of the electrical grid. In turn, the power control logic system 102 is able to effectively distribute any commands associated with such data received from the ISO to a distributed capacitor system 104 operably coupled to the power control logic system 102. The distributed capacitor system 104 is configured to engage in dynamic load shedding based on commands received from the power control logic system 102 in response to the data, plurality of signals, commands, and/or input from the ISO 200, thereby transitioning the FTM flexible data center from the steady-state power consumption mode to the curtailed-state power consumption mode.

The distributed capacitor system 104 includes a plurality of capacitors and power transforming equipment capable of storing AC power, converting said AC power to direct current (DC) power, and transmitting said DC power to a distributed computing system 106. In some embodiments, the distributed capacitor system 104 includes a plurality of computing systems configured to respectively control each of the plurality of capacitors and evenly distribute DC power to the distributed computing system 106 without causing damage to the distributed computing system 106 when the FTM flexible data transitions to the curtailed-state power consumption mode. Upon receiving a command from the ISO 200 to commence power consumption following a shut down, the distributed capacitor system 104 is configured to cause all of the plurality of capacitors to commence charging concurrently, and a load of the flexible data center returns to steady-state power consumption level in less than five seconds.

The FTM flexible data center 100 is operably coupled to a grid-facing substation 700 connected to the electrical grid 300. The grid-facing substation 700 is configured to provide transmission level AC current to be subsequently transmitted to energy consumers 400. The grid-facing substation 700 comprises at least circuit breakers, switches, and high to medium voltage transformers for delivering transmission level AC current to medium voltage AC power.

The FTM flexible data center 100 further includes a medium voltage electrical distribution system 108 comprising at least medium voltage transmission lines, circuit breakers, and switches for receiving medium voltage AC power from the grid-facing substation 700. The FTM flexible data center 100 also includes medium to low voltage transformers 110 configured to receive the medium voltage AC power from the medium voltage electrical distribution system 108 and step down the medium voltage AC power for delivery to at least the distributed capacitor system 104.

Accordingly, the FTM flexible data center of the present invention is able to address and overcome the drawbacks of current practices for managing electrical grid AC frequency in light of fluctuations in energy demand. More specifically, the power control logic system and distributed capacitor system allow for the FTM flexible data center to perform dynamic load shedding reliably and rapidly without damaging the distributed computing system. Thus, in response to increased consumption of electricity from energy consumers, and thus increase in overall demand, the FTM flexible data center is designed to shift this obligation off of the generator and onto itself as the distributed capacitor system acts as a large shock absorber for the distributed computing system that protects it from rapid fluctuations in power consumption that is detrimental to silicon chip reliability.

For example, the primary innovation the FTM flexible data center lies in the power control logic system and distributed capacitor system that allows for the FTM flexible data center to perform dynamic load shedding reliably and rapidly without damaging the distributed computing system. The primary motivation for the flexible data center to perform this service to the grid is due to monetary incentives put forth by the ISO and energy consumers who want the electrical grid AC frequency to remain constant at 60 Hz. When the electrical grid frequency departs significantly from 60 Hz, electrical grid protection equipment such as circuit breakers and switches will trip to protect transmission lines, transformers, AC generators 600, and turbine engines 500 from damage, but these blackouts come at a large cost to energy consumers, some of which are critical to life or protection of property. When energy consumers increase their consumption, the frequency of the electrical grid drops due to increased rotational energy required from turbine engines to meet the demand for electricity.

As ISO's have traditionally employed very strict day-ahead generation and grid capacity scheduling to control for this problem, while commanding spinning generators to increase or decrease their fuel consumption in real-time to adjust for minute frequency fluctuations. However, this method is unreliable on very short time scales and subjects the generators to unnecessary wear and tear due to constant throttle and brake fluctuations.

The FTM flexible data center is designed to shift this obligation off of the generator and onto itself as the distributed capacitor system acts as a large shock absorber for the distributed computing system that protects it from rapid fluctuations in power consumption that is detrimental to silicon chip reliability. The FTM flexible data center differs from other flexible data center technologies in at least two respects: 1) the FTM flexible data center is able to respond directly to signals, commands, and/or input from the ISO to reduce power consumption (as opposed to responding to grid pricing conditions or predetermined points in time for reducing load, as is the case with current flexible data center technologies); and 2) the FTM flexible data center is able to transition from the steady-state power consumption mode to the curtailed-state power consumption mode and stabilize in less than five seconds (a requirement set forth by the ISO to certify the flexible data center as a primary frequency response entity).

The power control logic system is unique in that it ingests the command from the ISO rapidly and distributes the information to the distributed capacitor system quickly and reliably through an advanced network design. The network design is configured such that it can send thousands of commands at the same time without congestion problems. The reason that the network must be designed this way is because the entire system would not work if it weren't for the distributed capacitor system. When an individual capacitor and power transforming unit receives a signal, it immediately abandons its "charging" state and enters into a "discharging" state. The grid sees the capacitor abandon its charging state which results in an immediate drop in power consumption. However, the distributed computing system has not stopped consuming power until the distributed capacitor system is fully discharged.

This system achieves an instant power consumption drop without shocking the silicon chips in the computing system with a drop in current. Rather, the distributed computing system sees a steady drop in current until the capacitor system is fully discharged, which is much safer for the computing equipment. When the ISO commands the FTM flexible data center to commence consumption after a shut down, the power control logic system commands all of the distributed capacitors to commence charging at the same time, and the load of the flexible data center returns to its steady-state power consumption in less than 5 seconds. Similarly, as the distributed capacitor system charges, it slowly begins distributing current to the computing system, which is much safer for the computing equipment than immediately subjecting it to a full current load.

The result of this system is the achievement of a primary frequency response load that can scale indefinitely to the scale of hundreds of megawatts. This system can scale reliably through the work of the distributed capacitor system without damaging the valuable computing equipment inside.

As used in any embodiment herein, the term "system", "module", or "unit" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

For any references and citations to other documents, such as patents, patent applications, patent publications, journals, books, papers, web contents, made throughout this disclosure, all such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A front-of-the-meter (FTM), grid-facing flexible data center configured to communicate with and receive data from an independent system operator (ISO) and assist in managing transmission of electrical energy to energy consumers in response to received data from the ISO, the FTM flexible data center being configured to dynamically modulate power consumption characteristics to thereby correct any real-time electrical grid frequency fluctuations and allow the electrical grid to maintain a stable alternating current (AC) frequency;

wherein FTM flexible data center is configured to:

receive, in real-time or near real-time, a plurality of signals from the ISO associated with an AC frequency of the electrical grid; and dynamically adjust power consumption characteristics if a signal indicates that the AC frequency of the electrical grid crosses a predetermined threshold as set by the ISO;

wherein the FTM flexible data center is configured to transition between a steady-state power consumption mode and a curtailed-state power consumption mode in response to the AC frequency of the electrical grid crossing the predetermined threshold;

wherein, if a given signal indicates that the AC frequency of the electrical grid drops below a predetermined threshold, the FTM flexible data center is configured to transition to the curtailed-state power consumption mode and thereby perform dynamic load shedding in real-time; and wherein the FTM flexible data center comprises:

a power control logic system configured to receive data, including the plurality of signals, commands, and/or input, from the ISO;

a distributed capacitor system operably associated with the power control logic system and configured to engage in dynamic load shedding based on commands received from the power control logic system in response to the data, plurality of signals, commands, and/or input from the ISO, thereby transitioning the FTM flexible data center from the steady-state power consumption mode to the curtailed-state power consumption mode.

2. The FTM flexible data center of claim 1, wherein electrical grid frequency fluctuations are associated with consumption of electrical energy from energy consumers.

3. The FTM flexible data center of claim 2, wherein increased consumption of electricity from energy consumers reduces the AC frequency of the electrical grid.

4. The FTM flexible data center of claim 2, wherein decreased consumption of electricity from energy consumers increases the AC frequency of the electrical grid.

5. The FTM flexible data center of claim 2, wherein non-spinning generators increase the overall net generation of electricity in the electrical grid and increase inertia required to alter AC frequency of the electrical grid.

6. The FTM flexible data center of claim 1, wherein the FTM flexible data center is configured to transition from the steady-state power consumption mode to the curtailed-state power consumption mode and stabilize in less than five seconds.

7. The FTM flexible data center of claim 1, wherein energy consumption within the curtailed-state power consumption mode is less than 5% of energy consumption within the steady-state power consumption mode.

8. The FTM flexible data center of claim 1, wherein the distributed capacitor system comprises a plurality of capacitors and power transforming equipment capable of storing AC power, converting said AC power to direct current (DC) power, and transmitting said DC power to a distributed computing system.

9. The FTM flexible data center of claim 8, wherein the distributed capacitor system comprises a plurality of computing systems configured to respectively control each of the plurality of capacitors and evenly distribute DC power to the distributed computing system without causing damage to the distributed computing system when the FTM flexible data transitions to the curtailed-state power consumption mode.

10. The FTM flexible data center of claim 8, wherein the FTM flexible data center is operably coupled to a grid-facing substation connected to the electrical grid, the grid-facing substation being configured to provide transmission level AC current to be subsequently transmitted to energy consumers.

11. The FTM flexible data center of claim 10, wherein the grid-facing substation comprises at least circuit breakers, switches, and high to medium voltage transformers for delivering transmission level AC current to medium voltage AC power.

12. The FTM flexible data center of claim 11, further comprising:

a medium voltage electrical distribution system comprising at least medium voltage transmission lines, circuit breakers, and switches for receiving medium voltage AC power from the grid-facing substation; and medium to low voltage transformers configured to receive the medium voltage AC power from the medium voltage electrical distribution system and step down the medium voltage AC power for delivery to at least the distributed capacitor system.

13. The FTM flexible data center of claim 8, wherein, upon receiving a command from the ISO to commence power consumption following a shut down, the distributed capacitor system is configured to cause all of the plurality of capacitors to commence charging concurrently, and a load of the flexible data center returns to steady-state power consumption level in less than five seconds.

14. The FTM flexible data center of claim 1, wherein the ISO transmits each of the plurality of signals associated an AC frequency of the electrical grid every two seconds.

15. The FTM flexible data center of claim 1, wherein the stable AC frequency is approximately 60 Hz.

16. The FTM flexible data center of claim 1, wherein the received data from the ISO comprises at least one of signals associated an AC frequency of the electrical grid, day-ahead generation scheduling, and day-ahead electrical grid capacity scheduling.

* * * * *